United States Patent
Nelson

(10) Patent No.: US 10,073,580 B2
(45) Date of Patent: *Sep. 11, 2018

(54) APPARATUS AND METHOD FOR POSITIONING WINDOWS ON A DISPLAY

(71) Applicant: Daniel Paul Nelson, Alpine, UT (US)

(72) Inventor: Daniel Paul Nelson, Alpine, UT (US)

( * ) Notice: Subject to any disclaimer, the term of this patent is extended or adjusted under 35 U.S.C. 154(b) by 314 days.

This patent is subject to a terminal disclaimer.

(21) Appl. No.: 13/854,950

(22) Filed: Apr. 1, 2013

(65) Prior Publication Data

US 2013/0219331 A1   Aug. 22, 2013

Related U.S. Application Data

(63) Continuation of application No. 12/131,503, filed on Jun. 2, 2008, now Pat. No. 8,434,019.

(51) Int. Cl.
*G06F 3/048* (2013.01)
*G06F 3/0481* (2013.01)
*G09G 5/14* (2006.01)

(52) U.S. Cl.
CPC ........ *G06F 3/0481* (2013.01); *G06F 3/04815* (2013.01); *G09G 5/14* (2013.01)

(58) Field of Classification Search
USPC ........................................ 715/799, 778, 795
See application file for complete search history.

(56) References Cited

U.S. PATENT DOCUMENTS

| | | | |
|---|---|---|---|
| 5,371,847 A | 12/1994 | Hargrove | |
| 5,390,295 A | 2/1995 | Bates et al. | |
| 5,657,463 A | 8/1997 | Bingham | |
| 5,796,402 A | 8/1998 | Ellison-Taylor | |
| 5,825,360 A | 10/1998 | Odam et al. | |
| 5,835,090 A * | 11/1998 | Clark | G06F 9/4443 715/764 |
| 5,838,318 A | 11/1998 | Porter et al. | |
| 5,999,177 A | 12/1999 | Martinez | |
| 6,008,809 A | 12/1999 | Brooks | |
| 6,141,007 A | 10/2000 | Lebling et al. | |
| 6,289,361 B1 | 9/2001 | Uchida | |
| 6,310,631 B1 | 10/2001 | Cecco et al. | |

(Continued)

OTHER PUBLICATIONS

Domingo Castelo JoaQuin, Loss Modeling Using Spreadsheet-based simulation, Risk Management and Insurance Review, 2007, Edition or vol. 10, No. 2, pp. 283-297 (Year: 2007).*

(Continued)

*Primary Examiner* — Tam T Tran
(74) *Attorney, Agent, or Firm* — Nelson and Nelson; Daniel P. Nelson; Alexis V. Nelson

(57) ABSTRACT

A method for positioning a window on a user's display may include providing, in a window-based computing environment, an image representing a display area of a user's computer screen. This image may be divided into a plurality of regions. Each region may represent an area within the display area. The method may further include enabling a user to select a region from the plurality of regions, such as, for example, with a mouse click, keystroke, keystroke combination, or the like. The method may then include automatically moving a window, such as the active window, in the window-based computing environment to the area represented by the region.

20 Claims, 7 Drawing Sheets

(56) References Cited

U.S. PATENT DOCUMENTS

| | | | |
|---|---|---|---|
| 6,724,403 | B1 | 4/2004 | Santoro et al. |
| 6,874,128 | B1 | 3/2005 | Moore et al. |
| 7,036,089 | B2 | 4/2006 | Bauer |
| 7,117,452 | B1 | 10/2006 | Pavelski et al. |
| 2002/0191028 | A1 | 12/2002 | Senechalle et al. |
| 2004/0008224 | A1 | 1/2004 | Molander et al. |
| 2004/0066408 | A1* | 4/2004 | Meyers .............. G06F 3/0481 715/764 |
| 2004/0239684 | A1* | 12/2004 | McGuire et al. ............. 345/619 |
| 2005/0022135 | A1* | 1/2005 | de Waal .................. G09G 5/14 715/788 |

OTHER PUBLICATIONS

Patrick Marshall, PixoFoto Image Editor Runs Past Windows Competition, Jul. 13, 1992, ABI/Inform, Edition or vol. 14, No. 28, pp. 70-72 (Year: 1992).*

* cited by examiner

APPARATUS AND METHOD FOR POSITIONING WINDOWS ON A DISPLAY

BACKGROUND

Field of the Invention

This invention relates to apparatus and methods for positioning windows in a window-based computing environment.

Description of the Related Art

When it comes to establishing a more comfortable, efficient, and faster computing environment, the computer monitor may easily be the most important output device of a user's computer system. In a time when most computer components are getting smaller, many believe that bigger is better when it comes to monitors. A larger and higher resolution monitor can reduce eyestrain and increase productivity by allowing a user to view multiple applications simultaneously or view an entire document, spreadsheet, or image without needing to use directional arrows. For this reason, many individuals now build computer systems with multiple monitors despite the fact that the setup may require multiple video cards and cords and leave visual obstructions (i.e., bezels) running through the user's visual workspace.

Fortunately, monitors continue to get bigger and bigger with ever increasing resolutions. For example, at the time of drafting this disclosure, Dell® is now marketing a 30" LCD computer monitor with a resolution of 2560×1600 pixels. Apple® has released a monitor of similar dimensions and specifications. It is not difficult to anticipate computers monitors reaching 40" or more, providing a user with a vast amount of useable real estate.

These large screens allow a user to more closely simulate a real-life "desktop" by enabling the user to view multiple files or documents (i.e., "windows") simultaneously. For example, a user may find it advantageous to simultaneously view multiple electronic resource documents, web pages, images, spreadsheets, or the like while working on a research paper or article, without having to toggle between multiple windows. The ability to view multiple documents simultaneously may also aid considerably in moving to a paperless office. Monitors will most likely continue to increase in both size and resolution, creating a need to more effectively manage and utilize the additional real estate.

Presently, "windows" in the Windows® operating systems include the ubiquitous "close," "restore down," "maximize," and "minimize" buttons near the upper right corner of each window. While useful, these buttons do not enable a user to efficiently position windows at desired locations on the user's computer screen. For example, to get a window to simply cover the left side of a user's computer screen, the user may need to click the "restore down" button, drag the window until the top left corner of the window coincides with the top left corner of the screen, and then manually resize the window to fill the left side of the screen. Even after completing this process, some windows may still overlap or not be positioned exactly as desired by a user.

Alternatively, Windows® provides the "Tile Windows Vertically," "Tile Windows Horizontally," and "Cascade Windows" commands which are accessible from the Windows taskbar. However, these commands are not as intuitive as they could be and they do not provide a desired level of control when positioning windows. For example, to get a window to cover the left half of the user's screen, a user would need to open exactly two windows (and make sure neither is minimized) and then select "Tile Windows Vertically" from the taskbar. Alternatively, if more than two windows are open, the user would need to minimize all but two windows and then select "Tile Windows Vertically." Because a user may have many windows open at any given time, any number of which may or may not be minimized, this process may be cumbersome, unintuitive, and time-consuming.

Other third-party window positioning programs may require a user to initially select from a number of different window patterns. The user may then need to link different applications or windows with regions in one of the window patterns. The program may then position the windows or applications in the corresponding regions of the screen corresponding to the pattern. Such a method for positioning windows is cumbersome and unintuitive. Consequently, some users may choose to forego using such programs altogether.

In view of the foregoing, what is needed is an apparatus and method for more efficiently and intuitively organizing and positioning windows in a user's desktop environment. Ideally, such an apparatus and method would more closely mimic the way a user organizes a real physical desktop. Such an apparatus and method would also ideally be simple and may augment, rather than replace or alter, the "maximize," "minimize," and "restore down" buttons familiar to Windows users. Further needed are apparatus and methods to provide a user a greater level of control when positioning windows.

SUMMARY

The present invention has been developed in response to the present state of the art, and in particular, in response to the problems and needs in the art that have not yet been fully solved by currently available window sizing and positioning systems. Accordingly, the present invention has been developed to provide a novel apparatus and method for positioning windows on a user's display in a window-based computing environment.

In a first embodiment of the invention, a method for positioning windows on a user's display may include providing, in a window-based computing environment, an image representing a display area of a user's computer screen. This image may be divided into a plurality of regions. Each region may represent an area within the display area. The method may further include enabling a user to select a region from the plurality of regions with a mouse click, keystroke, keystroke combination, or the like. The method may then include automatically moving a window, such as the active window in the window-based computing environment, to the area represented by the region.

In certain embodiments, the image may be provided at the prompting of a user by clicking an icon, button, menu item, or by hitting a quick-key, key combination, or the like. Once the user selects a region from the image, the method may include automatically hiding the image from the view of the user.

In certain embodiments, the method may include enabling a user to select more than one region from the plurality of regions. For example, a user may desire to have a window cover an area represented by multiple regions. When a user selects multiple regions, the method may automatically move a window in the window-based computing environment to the area corresponding to the multiple regions.

In selected embodiments, the images may be one of a plurality of images corresponding to different computer screens of the user. For example, if a user is using multiple monitors, an image may be provided for each monitor and the selection of a region within one of the images may be used to move a window to a specific area on a specific display.

The image may appear in various locations on the user's screen to make it convenient to access. For example, the image may be provided near an upper right hand corner of the window, a mouse pointer of the user, or a system tray of the window-based computing environment.

In another embodiment of the invention, an apparatus for positioning windows on a user's display may include a presentation module to display, in a window-based computing environment, an image representing a display area of a user's computer screen. The image may be divided into a plurality of regions. Each region may represent an area within the display area. A selection module may be provided to enable a user to select a region from the plurality of regions. A positioning module may be provided to automatically move a window in the window-based computing environment to the area represented by the region. Each of these modules may be implemented in hardware, software, or combinations thereof.

In certain embodiments, the apparatus may further include an initiation module to trigger operation of the presentation module at the prompting of a user and a concealment module to automatically hide the image when the user selects a region. In selected embodiments, the selection module may be configured to enable a user to select more than one region from the plurality of regions. In such embodiments, the positioning module may be configured to automatically move a window to the area represented by the multiple regions.

In certain embodiments, the presentation module may be configured to display a plurality of images, each corresponding to a different computer screen of the user. The presentation module may also be configured to display the image proximate at least one of the upper right hand corner of the window, a mouse pointer of the user, and a system tray of the window-based computing environment.

In another embodiment of the invention, a computer-readable medium is disclosed to store a program of machine-readable instructions executable by a computer to perform operations to position a window on a user's display. Such operations may include providing, in a window-based computing environment, an image representing a display area of a user's computer screen. The image may be divided into a plurality of regions, with each region representing an area within the display area. The operations may further include enabling a user to select a region from the plurality of regions. The operations may further include automatically moving a window in the window-based computing environment to the area represented by the region.

The present invention provides a novel apparatus, method, and article of manufacture for positioning windows on a user's display. The features and advantages of the present invention will become more fully apparent from the following description and appended claims, or may be learned by the practice of the invention as set forth hereinafter.

BRIEF DESCRIPTION OF THE DRAWINGS

In order that the advantages of the invention will be readily understood, a more particular description of embodiments of the invention briefly described above will be rendered by reference to specific embodiments illustrated in the appended drawings. Understanding that these drawings depict only typical embodiments of the invention and are not therefore to be considered limiting of its scope, the invention will be described and explained with additional specificity and detail through the use of the accompanying drawings, in which.

DETAILED DESCRIPTION

Figure 1:
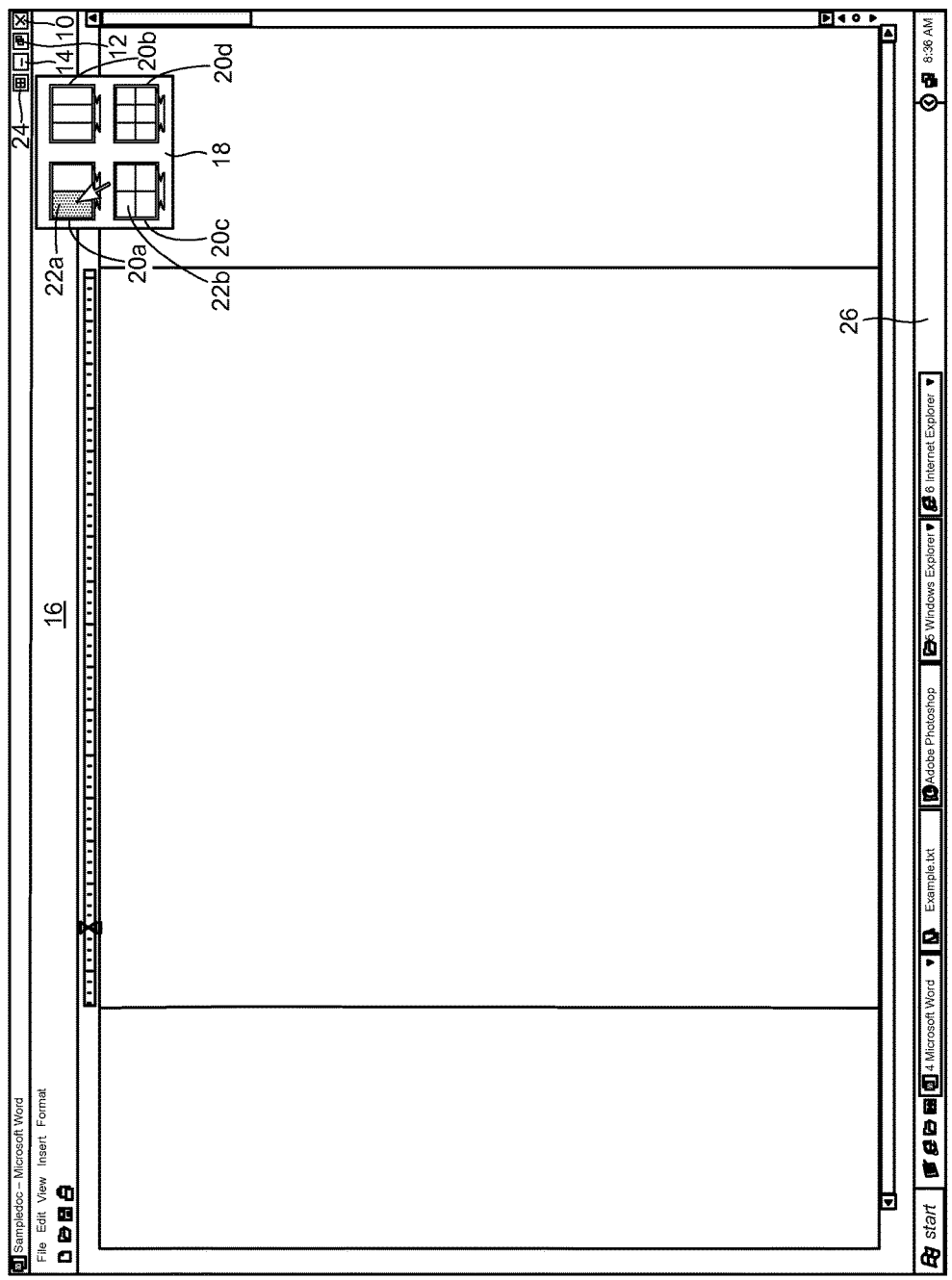
FIG. 1 shows one contemplated embodiment of a menu to enable a user to position a window at a desired position on a display.

It will be readily understood that the components of the present invention, as generally described and illustrated in the Figures herein, may be arranged and designed in a wide variety of different configurations. Thus, the following more detailed description of embodiments of apparatus and methods in accordance with the invention, as represented in the Figures, is not intended to limit the scope of the invention, as claimed, but is merely representative of selected embodiments in accordance with the invention.

One or more of the functional units described in this specification have been labeled as modules in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in software for execution by various types of processors. An identified module of executable code may, for instance, comprise one or more physical or logical blocks of computer instructions which may, for instance, be organized as an object, procedure, or function. Nevertheless, the executables of an identified module need not be physically located together, but may comprise disparate instructions stored in different locations which, when joined logically together, comprise the module and achieve the stated purpose for the module.

Indeed, a module of executable code could be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices, and may exist, at least partially, merely as electronic signals on a system or network.

Reference throughout this specification to "one embodiment," "an embodiment," or similar language means that a particular feature, structure, or characteristic described in connection with the embodiment may be included in at least one embodiment of the present invention. Thus, appearances of the phrases "in one embodiment" or "in an embodiment" in various places throughout this specification are not necessarily all referring to the same embodiment.

Furthermore, the described features, structures, or characteristics may be combined in any suitable manner in one or more embodiments. In the following description, specific details are provided, such as examples of programming, software modules, user selections, etc., to provide a thorough understanding of embodiments of the invention. One skilled in the relevant art will recognize, however, that the invention may be practiced without one or more of the specific details, or with other methods, components, etc. In other instances, well-known structures, or operations are not shown or described in detail to avoid obscuring aspects of the invention.

The illustrated embodiments of the invention will be best understood by reference to the drawings, wherein like parts are designated by like numerals throughout. The following description is intended only by way of example, and simply illustrates certain selected embodiments of apparatus and methods that are consistent with the invention as claimed herein.

Referring to FIG. 1, as mentioned, the Windows® operating system as well as other window-based computing environments may enable a user to simulate a real-life "desktop" by enabling the user to simultaneously open multiple files or documents in different windows. These windows may be used to display a varied assortment of applications and files such as electronic documents, web pages, images, spreadsheets, as well as a host of other different files and applications. FIG. 1 shows one example of a window 16, in this case an electronic word-processing application containing an open document.

Presently, most windows 16 displayed in the Windows® operating systems include the ubiquitous "close" button 10, "restore down" button 12 (which changes to a maximize button 12 when the restore down feature is used), and "minimize" button 14 near the upper right-hand corner of each window 16. As mentioned previously, these buttons do not enable a user to efficiently position windows 16 or provide the user with a desired level of control when positioning windows 16 on the user's screen (display). Furthermore, although the Windows® task bar 26 may enable a user to effectively toggle between windows, it does not provide effective functionality to view multiple windows simultaneously with a desired arrangement and placement.

To improve efficiency and provide the user with an improved level of control, in selected embodiments, a palette 18, or menu 18, may be provided that includes one or more images 20a-d. Each image 20a-d may represent a display area of a user's computer screen and may be divided into a plurality of regions 22. Each region may represent an area within the display area. The regions 22 may be used to divide the user's screen into halves, thirds, quarters, sixths, or the like. A user may select one or more of the regions 22 with a mouse click, keystroke, keystroke combination, or the like. This action may automatically move a window 16, such as the active window, to the area of the screen represented by the region.

For example, a mouse click on the region 22a may automatically move the window 16 to the left half of the user's computer screen. Similarly, a mouse click on the region 22b may automatically move the window 16 to the upper left-hand quarter of the user's computer screen, and so forth. In certain embodiments, once the window 16 is positioned and sized to correspond to a desired region 22, the window may be maximized and then returned to the same region 22 by simply clicking the restore down button 12. Thus, the system may be designed to remember which region 22 was last selected when using the restore down feature.

In certain embodiments, the regions 22 may be configured to change color or shade when the user moves a mouse pointer over the regions 22, as shown by region 22a. This will help the user know that he or she is selecting the desired region 22 or regions 22 prior to clicking the mouse.

Figure 2:
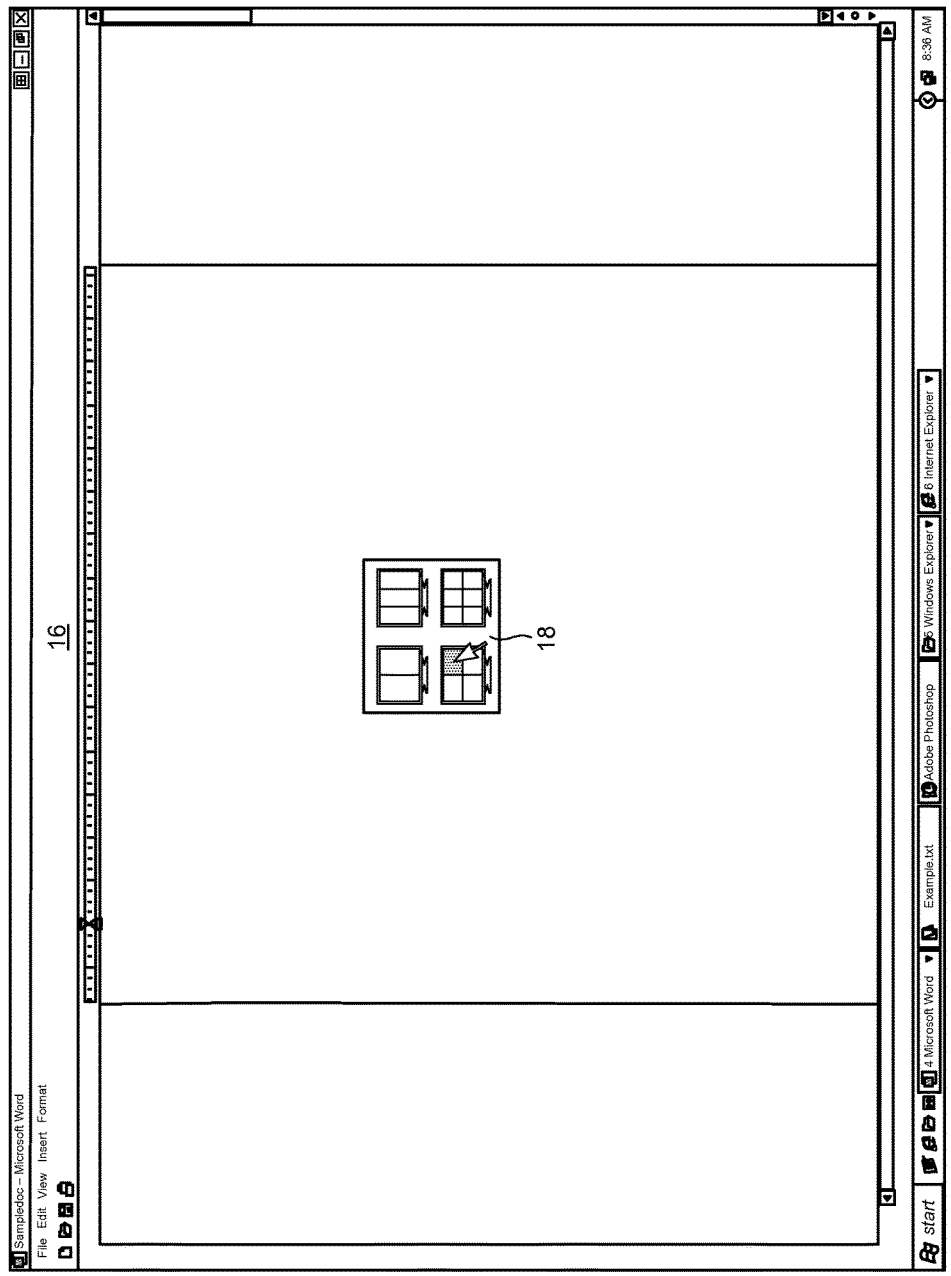
FIG. 2 shows another contemplated embodiment of a menu on a user's display.
Figure 3:
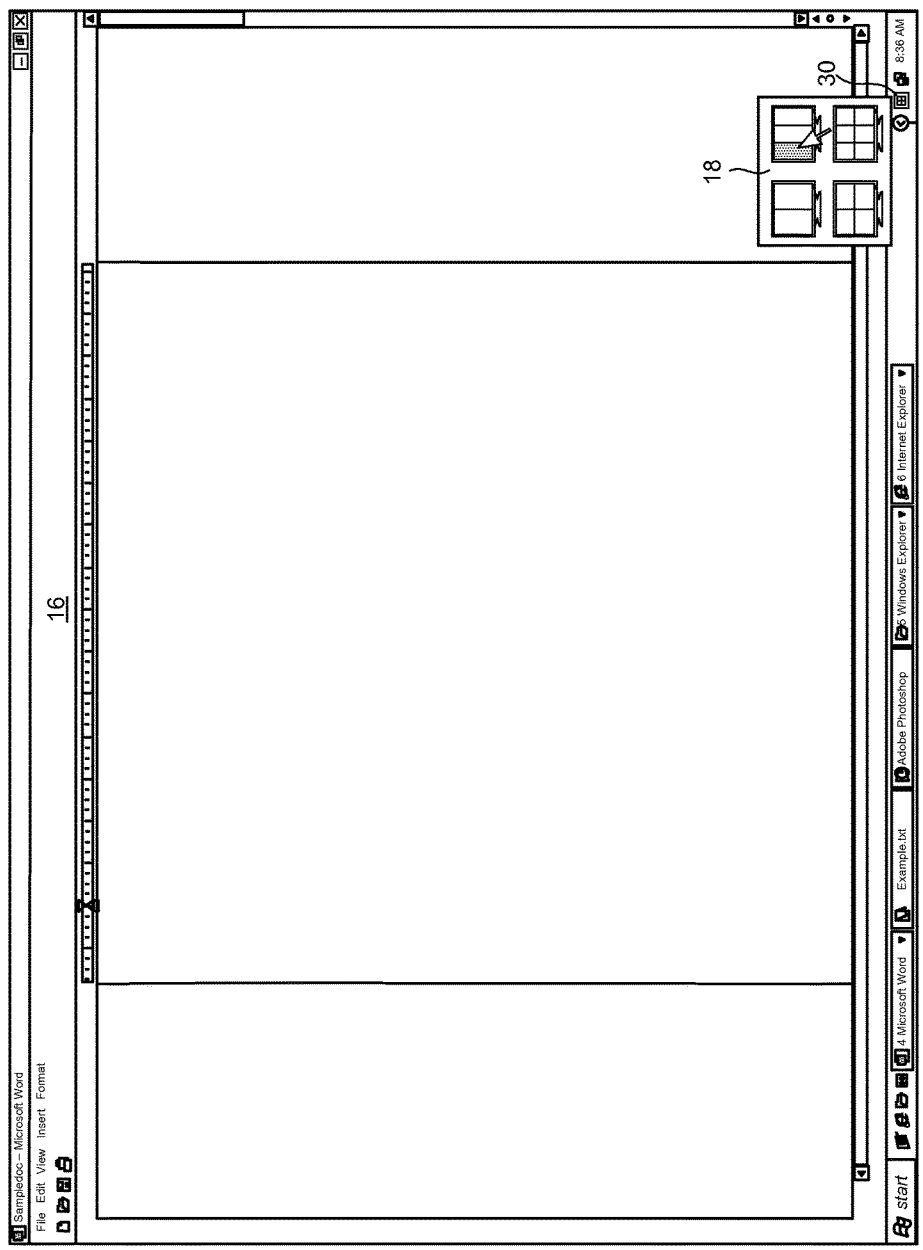
FIG. 3 shows another contemplated embodiment of a menu on a user's display.

In certain embodiments, the menu 18 and corresponding images 20a-d may appear at the prompting of a user. For example, in selected embodiments, the menu 18 may appear by clicking a new button 24, such as a button 24 positioned near the standard Windows® buttons 10, 12, 14. In other embodiments, the menu 18 may be configured to appear upon left-clicking an existing or standard windows button such as the restore down (or maximize) button 12. In yet other embodiments, a quick-key or key combination may be used to reveal the menu 18. The menu 18 may appear at various locations on the screen, including at or near the top right-hand corner of a window 16 or at a location at or near the user's vertical mouse height, as shown in FIG. 2. This prevents the user from having to move his or her mouse pointer a substantial distance, thereby improving efficiency. In other embodiments, the menu 18 may appear by clicking an icon such as a system tray icon 30 as illustrated in FIG. 3. The above examples represent just a few examples of how and where the menu 18 could be made to appear and is not intended to limit the invention to the foregoing examples.

Once the user selects one or more regions 22 from the image 20, the window 16 may be moved to the area of the screen represented by the selected region 22 and the menu 18 may disappear from the view of the user.

In selected embodiments, the images 20a-d and corresponding regions 22 that are provided may be those deemed to be most commonly needed or desired (e.g., halfs, thirds, quarters, sixths, etc.). As monitors continue to grow, smaller divisions (e.g., eighths, etc.) may be desired and included in the menu 18.

Figure 4:
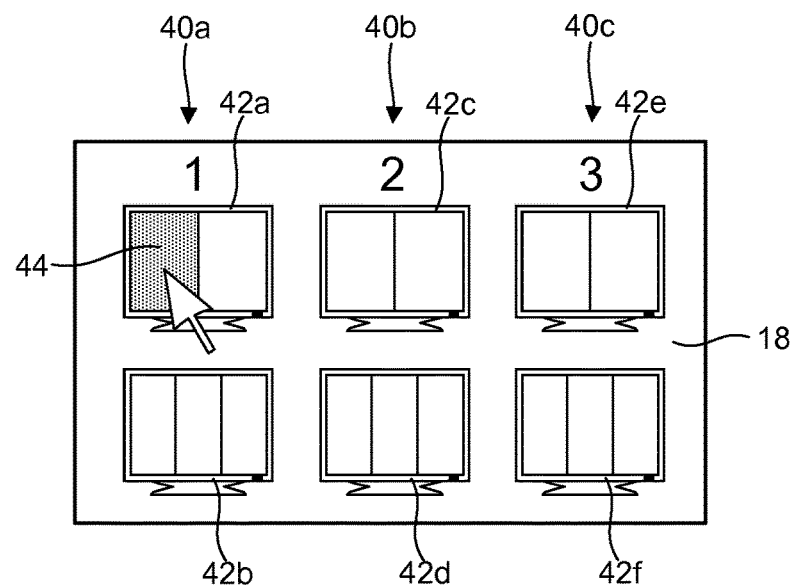
FIG. 4 shows one embodiment of a menu to work with multiple monitors.

Referring to FIG. 4, in selected embodiments, the menu 18 may be configured to work with a computer system having multiple monitors. For example, a first set 40a of images 42a, 42b may be configured to position a window 16 on a first monitor, a second set 40b of images 42c, 42d may be configured to position a window 16 on a second monitor, and a third set 40c of images 42e, 42f may be configured to position a window 16 on a third monitor. For example, selection of the region 44 may move a window 16 to the left half of the first monitor, and so forth. Thus, the menu 18 may be configured to work with a multiple monitor setup.

Figure 5:
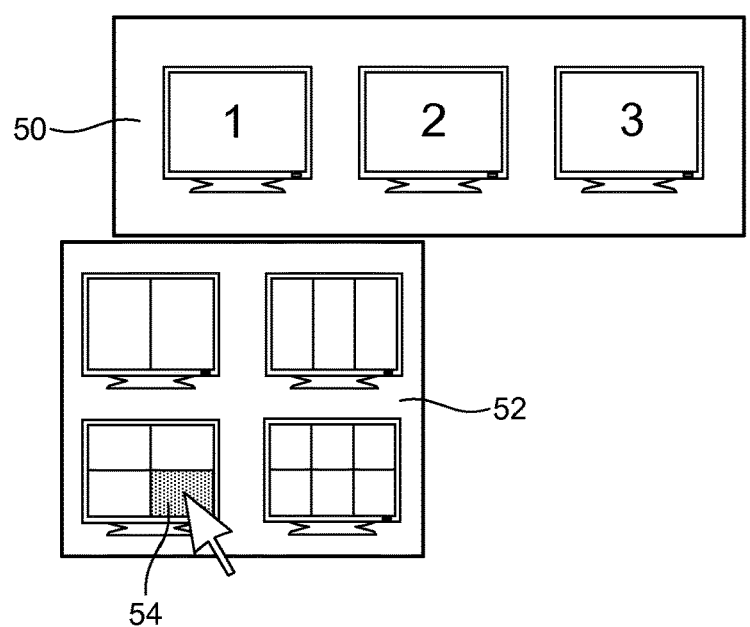
FIG. 5 shows another embodiment of a menu to work with multiple monitors.

Referring to FIG. 5, in other embodiments, a two-stage menu system may be used to position windows across a multiple monitor setup. For example, a first menu 50 may be used to select a monitor from multiple monitors. A second menu 52, which may appear after making a selection on the first menu 50, may be used to select the location of a window 16 on the selected monitor. Thus, if a user selects the first monitor on the first menu 50, and then selects the region 54 on the second menu 52, the system may automatically position a window 16 over the lower right-hand quarter of the user's first computer screen.

Figure 6A:
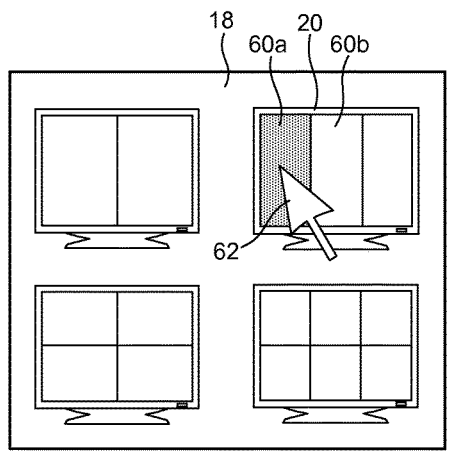
FIGS. 6A and 6B show one embodiment of a menu enabling a user to select multiple regions in an image.
Figure 6B:
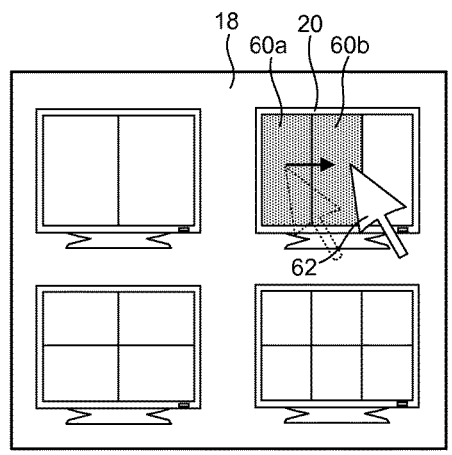
Figure 7:
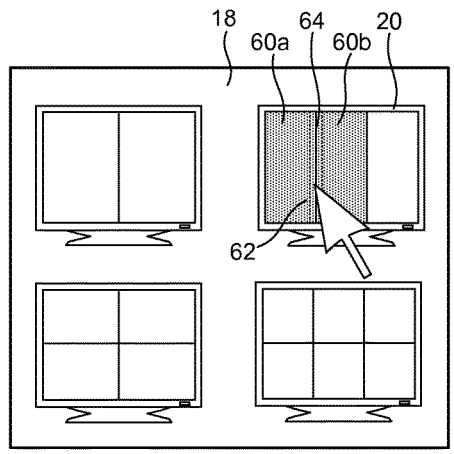
FIG. 7 shows another embodiment of a menu enabling a user to select multiple regions in an image.

Referring to FIGS. 6A, 6B, and 7, as mentioned, in selected embodiments, an image 20 may be configured to enable a user to select more than one region. That is, a user may desire to have a window cover an area represented by multiple regions. For example, if an image 20 divides the screen into thirds, like the image 20 illustrated in FIG. 6A, the user may wish to position a window over the left two thirds of the screen. To do so, the image 20 may be configured to enable the user to select the left two regions 60a, 60b simultaneously.

For example, as shown in FIG. 6A, the image 20 may enable a user to click a first region 60a. While holding the mouse button down, the user may drag the mouse pointer 62 across to the adjacent region 60b, as shown in FIG. 6B. The user may then release the mouse button to automatically resize and position the window 16 over the left two thirds of the user's computer screen. As shown in FIGS. 6A and 6B, each region 60a, 60b may change color or shade as the user clicks and drags across the regions 60a, 60b, thereby allowing the user to see that he or she is selecting the desired regions. Each of the images, as shown for example in FIG. 1, may enable the user to select any number of regions within each image, assuming that any such selection forms a rectangular shape.

Referring to FIG. 7, in another contemplated embodiment, multiple regions 60a, 60b may be selected by positioning the tip of the mouse pointer 62 at or near a boundary 64 between multiple regions 60a, 60b. This action may change the shape or color of the regions 60a, 60b, letting the user know that he or she is selecting multiple regions. A mouse click near the boundary 64 may then position a window 16 over the area of the screen represented by the regions 60a, 60b.

Figure 8:
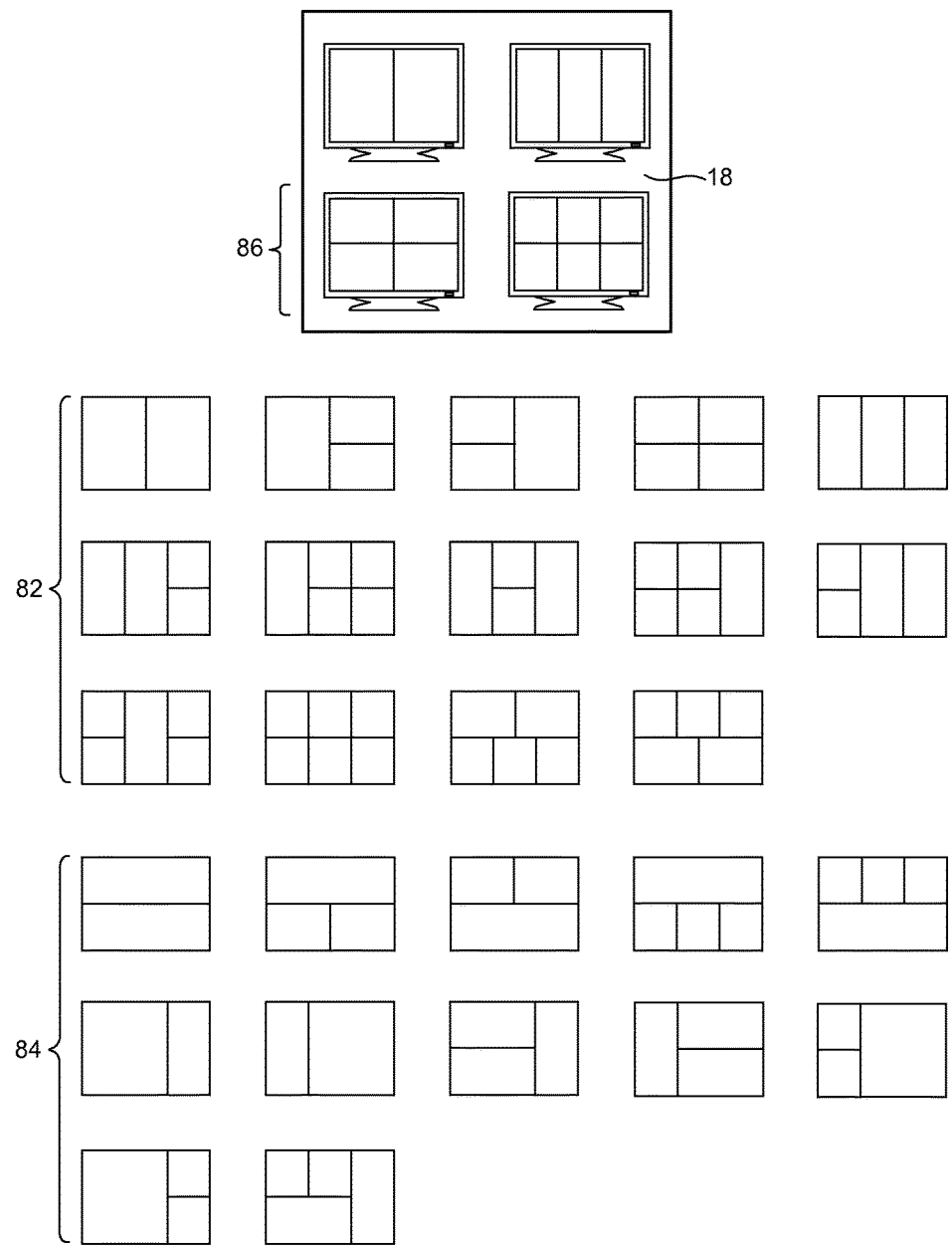
FIG. 8 shows various different window patterns that may be created with one embodiment of a menu in accordance with the invention.

Referring to FIG. 8, the menu system disclosed herein may be used to create a wide variety of window patterns on a user's screen. For example, the illustrated menu 18 may be used to create any of the patterns 82 by selecting various regions on the menu 18. If the menu 18 is also configured to enable a user to select multiple regions (as illustrated in FIGS. 6A, 6B, and 7), a host of other patterns 84 are also possible, including others that are not shown. In reality, if the menu 18 allows the user to select multiple regions, only the bottom two images 86 of the menu 18 are needed to produce any of the patterns shown in FIG. 8, including many that are not shown. Thus, the menu 18 may provide a significant amount of versatility when positioning and sizing windows 16.

Figure 9:
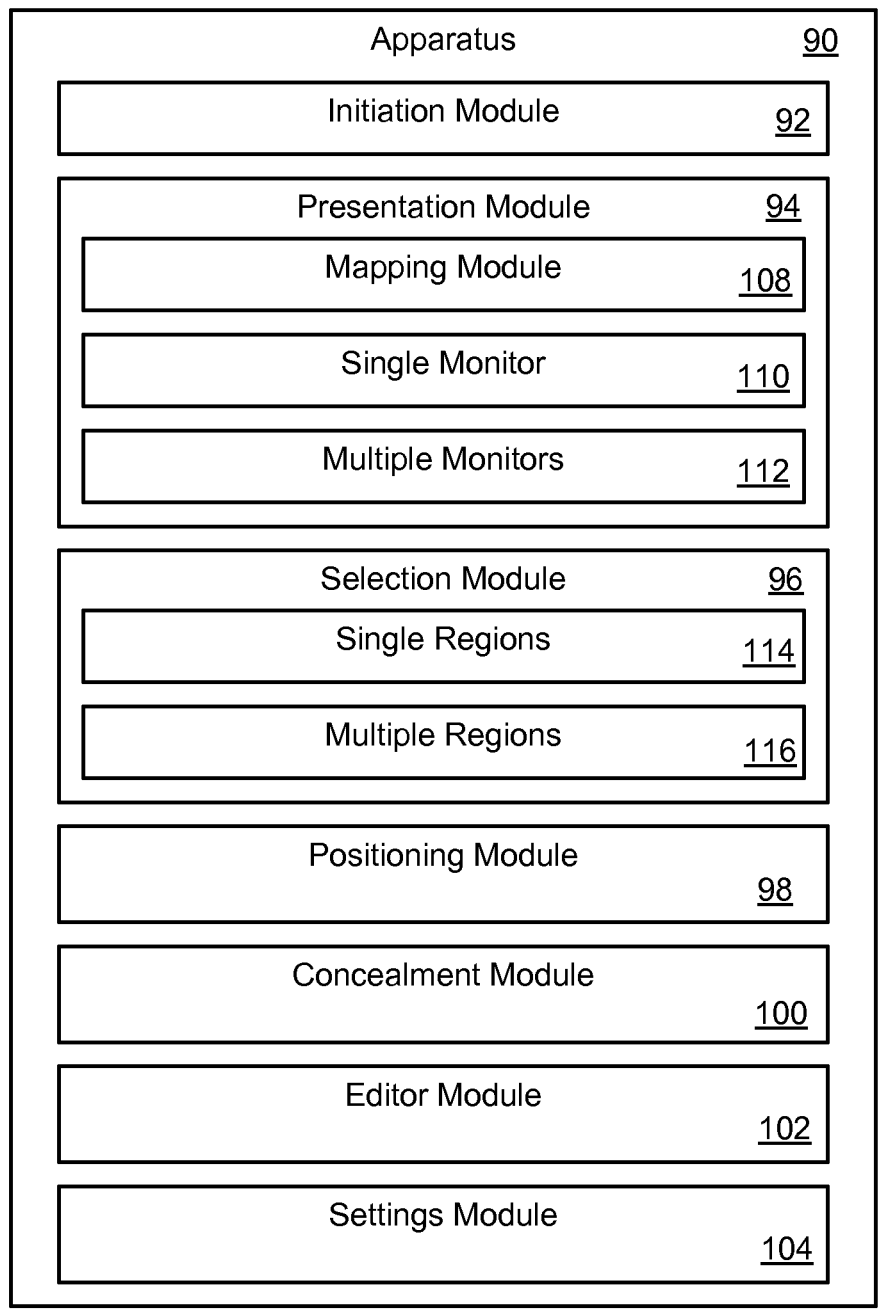
FIG. 9 shows one embodiment of an apparatus in accordance with the invention.

Referring to FIG. 9, in selected embodiments, an apparatus 90 for implementing a menu 18 in accordance with the invention may include various modules 92-104. These modules may be implemented in hardware, software, firmware, or a combination thereof, but most likely will be implemented as software modules. The apparatus 90 does not necessarily include all of the modules 92-104, but may include additional or fewer modules than those illustrated. Furthermore the modules 92-104 are not necessarily organized as illustrated but simply show various functions that may be provided by a menu 18 in accordance with the invention.

In certain embodiments, the apparatus 90 may include an initiation module 92 to initiate the menu 18 in response to user action. For example, the initiation module 92 may initiate the menu 18 when the user clicks an icon, button, or manually presses a button or hits a quick key or key combination. A presentation module 94 may be used to present and provide the look and feel of the menu 18 displayed on the user's computer screen. In selected embodiments, the presentation module 94 may include a mapping module 108 to map each of the regions 22 presented in one or more images 20 to areas of the user's computer screen. In certain embodiments, the mapping module 108 may function by determining the resolution of the user's screen (e.g., 1200×1600, 1280×1024, etc.) and then dividing the useable space into areas corresponding to each of regions 22. These areas may then be mapped to the regions 22 such that selection of a region 22 will move a window to the area(s) represented by the region(s). In selected embodiments, the presentation module 94 may also provide support for a single monitor 110 or multiple monitors 112, as was discussed in association with FIGS. 4 and 5. In selected embodiments, the presentation module 94 may be configured to detect the number and configuration of monitors on the user's computer system and tailor the menu 18 accordingly.

In certain embodiments, a selection module 96 may enable a user to select regions 22 on the menu 18 by way of a mouse click, key stroke, key combination, button press, or the like. The selection module 96 may enable the user to select a single region 114, or multiple regions 116 as was discussed in association with FIGS. 6A through 7. The ability to select multiple regions 22 may provide additional versatility to the user and allow the user to arrange windows in patterns that would not otherwise be possible selecting a single region.

A positioning module 98 may be provided to position the menu 18 at a desired area of the user's computer screen. For example, the positioning module 98 may position the menu 18 proximate the upper right hand corner of a window 16, at or near the vertical mouse height of the user, proximate a system tray icon, or the like. A concealment module 100 may conceal the menu 18 from the user's view once the user has selected one or more regions 22 in the menu 18.

In selected embodiments, the apparatus 90 may also include an editor module 102 and a settings module 104. The editor module 102 may allow a user to select the type and number of images 20 that a user would like displayed on the menu 18. For example, the user may only want images 20 that he or she uses most often, such as images that divide the screen into quarters or sixths for display on the menu 18. In other embodiments, the editor module 102 may allow the user to design the layout and dimensions of the regions 22 of the images 20. A settings module 104, on the other hand, may enable a user to select preferences with regard to colors used for the menu 18, desired position or dimensions of the menu 18 on the user's computer screen, desired method for initiating the menu 18, transparency of the menu 18, or the like. Other settings are also possible and are intended to be captured within the scope of the invention.

One of skill in the art will recognize that the apparatus and methods disclosed herein are not limited to physical screens or displays but may also be used with virtual screens or displays. For example, a virtual screen or display may be located within or be a subset of a physical screen or display, such as where the Windows® operating system is emulated within a window of another operating system. Thus, the menu 18 may be used to organize windows within a virtual screen or display. Furthermore, the menu 18 may also be used to organize windows within particular applications. For example, various applications, such as Adobe Acrobat®, allow a user to open up several documents in sub-windows within a larger window. These sub-windows may be minimized, maximized, or the like within the larger window. In certain embodiments, the menu 18 may be used to organize the sub-windows within the larger window. Thus, for the purpose of this description, the terms "display," "screen," or "display area" are used broadly to encompass each of these embodiments.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

The invention claimed is:

1. A method for positioning a window on a user's display, the method comprising:
    providing, in a window-based computing environment, an image representing a display area of a user's computer screen, wherein the image comprises a plurality of regions, each region representing an area within the display area, wherein the regions are arranged in substantially the same way as the corresponding areas in the display area;
    enabling the user to select, as a group, multiple regions from the plurality of regions; and
    automatically moving, in accordance with the selection, a selected window in the window-based computing environment to the area represented by the multiple regions.

2. The method of claim 1, wherein providing comprises providing at the prompting of a user.

3. The method of claim 1, wherein the selected window is the active window in the window-based computing environment.

4. The method of claim 1, further comprising automatically hiding the image when the user selects the multiple regions.

5. The method of claim 1, wherein enabling the user to select the multiple regions comprises enabling the user to drag a pointer across the multiple regions.

6. The method of claim 5, wherein the pointer is a mouse pointer.

7. The method of claim 1, wherein the image is one of a plurality of images, wherein selected images of the plurality of images correspond to different computer screens of the user.

8. The method of claim 1, wherein the image is provided proximate at least one of the upper right hand corner of the window, a mouse pointer of the user, and a system tray of the window-based computing environment.

9. An apparatus for positioning a window on a user's display, the apparatus comprising:
    at least one processor; and
    at least one memory device coupled to the at least one processor and storing instructions for execution on the at least one processor, the instructions causing the at least one processor to:
        display, in a window-based computing environment, an image representing a display area of a user's computer screen, wherein the image comprises a plurality of regions, each region representing an area within the display area, wherein the regions are arranged in substantially the same way as the corresponding areas in the display area;
        enable the user to select, as a group, multiple regions from the plurality of regions; and
        automatically move, in accordance with the selection, a selected window in the window-based computing environment to the area represented by the multiple regions.

10. The apparatus of claim 9, wherein the instructions further trigger display of the image at the prompting of a user.

11. The apparatus of claim 9, wherein the selected window is the active window in the window-based computing environment.

12. The apparatus of claim 9, wherein the instructions further automatically hide the image when the user selects the multiple regions.

13. The apparatus of claim 9, wherein selecting the multiple regions comprises dragging a pointer across the multiple regions.

14. The apparatus of claim 13, wherein the pointer is a mouse pointer.

15. The apparatus of claim 9, wherein the instructions further display a plurality of images, wherein selected images of the plurality of images correspond to different computer screens of the user.

16. The apparatus of claim 9, wherein the instructions further display the image proximate at least one of the upper right hand corner of the window, a mouse pointer of the user, and a system tray of the window-based computing environment.

17. A non-transitory computer-readable medium storing a program of machine-readable instructions executable by a computer to perform operations to position a window on a user's display, the operations comprising:
    providing, in a window-based computing environment, an image representing a display area of a user's computer screen, wherein the image comprises a plurality of regions, each region representing an area within the display area, wherein the regions are arranged in substantially the same way as the corresponding areas in the display area;
    enabling the user to select, as a group, multiple regions from the plurality of regions; and
    automatically moving, in accordance with the selection, a selected window in the window-based computing environment to the area represented by the multiple regions.

18. The non-transitory computer-readable medium of claim 17, wherein providing comprises providing at the prompting of a user.

19. The non-transitory computer-readable medium of claim 17, wherein the selected window is the active window in the window-based computing environment.

20. The non-transitory computer-readable medium of claim 17, wherein the image is one of a plurality of images, wherein selected images of the plurality of images correspond to different computer screens of the user.

* * * * *